United States Patent [19]
Anderson

[11] Patent Number: 6,053,092
[45] Date of Patent: Apr. 25, 2000

[54] WATER COOLER ACCESSORY

[76] Inventor: Robert S. Anderson, 9090 SW. 104th La., Ocala, Fla. 34481

[21] Appl. No.: 09/285,218

[22] Filed: Apr. 1, 1999

[51] Int. Cl.[7] .................................................... A47J 31/00
[52] U.S. Cl. ............................... 99/275; 99/279; 99/305; 99/323.3; 222/639; 222/640; 222/383
[58] Field of Search .......................... 99/275, 279, 323.3, 99/305; 222/639, 640, 383; 141/250

[56] References Cited

U.S. PATENT DOCUMENTS

| | | |
|---|---|---|
| 3,900,136 | 8/1975 | Paranto .................................. 222/639 |
| 4,094,233 | 6/1978 | Martin ..................................... 99/305 |
| 4,655,123 | 4/1987 | Schrader ................................. 99/279 |
| 4,713,526 | 12/1987 | Smit ...................................... 219/332 |
| 4,815,366 | 3/1989 | Hauslein ................................. 99/283 |
| 4,872,403 | 10/1989 | LaGesse et al. ........................ 99/280 |
| 4,966,070 | 10/1990 | Frisch ..................................... 99/302 |
| 5,225,076 | 7/1993 | Meredith ................................ 210/181 |
| 5,285,718 | 2/1994 | Webster et al. ...................... 99/279 X |

*Primary Examiner*—Reginald L. Alexander
*Attorney, Agent, or Firm*—Joseph N. Breaux

[57] ABSTRACT

A water cooler accessory that is connectable between the dispensing spigot of a water cooler and the water input port of a coffee maker and that can be activated to transfer a predetermined amount of water to the coffee maker.

2 Claims, 3 Drawing Sheets

WATER COOLER ACCESSORY

TECHNICAL FIELD

The present invention relates to water routing devices and more particularly to a water cooler accessory that includes a pump unit having an intake tube and a discharge tube, a water cooler spigot connecting fitting attached to the end of intake tube, and a frustro-conical shaped coffee maker connecting fitting attached to the end of the discharge tube; the pump unit including an electric water pump connected between a pump inlet pipe attached to the intake tube and a pump outlet pipe attached to the discharge tube and a pump control unit including a number of cup volume select buttons and a timer circuit in controlling connection with the electric water pump for running the pump for predetermined periods in response to depression of each of the cup volume select buttons; the water cooler spigot connecting fitting including a cooler spigot insertion cavity, a spigot attachment set screw in connection with the cooler spigot insertion cavity for maintaining the end of a cooler spigot securely within the cooler spigot insertion cavity, and a connecting fitting spigot valve having a fitting spigot handle attached thereto; the connecting fitting spigot valve being positioned such that a continuous water flow pathway exists between the cooler spigot insertion cavity and the intake tube; the frustro-conical shaped coffee maker connecting fitting having a bottom surface provided with a water discharge port in the center thereof and in connection with the discharge tube.

BACKGROUND ART

Transferring water between the water cooler and the coffee maker can be aggravating. It would be desirable, therefore, to have a water transferring device that could be connected between the dispensing spigot of a water cooler and the water input port of a coffee maker that could be activated to transfer a predetermined amount of water to the coffee maker.

GENERAL SUMMARY DISCUSSION OF INVENTION

It is thus an object of the invention to provide a water cooler accessory that is connectable between the dispensing spigot of a water cooler and the water input port of a coffee maker and that can be activated to transfer a predetermined amount of water to the coffee maker.

It is a further object of the invention to provide a water cooler accessory that includes a pump unit having an intake tube and a discharge tube, a water cooler spigot connecting fitting attached to the end of intake tube, and a frustro-conical shaped coffee maker connecting fitting attached to the end of the discharge tube; the pump unit including an electric water pump connected between a pump inlet pipe attached to the intake tube and a pump outlet pipe attached to the discharge tube and a pump control unit including a number of cup volume select buttons and a timer circuit in controlling connection with the electric water pump for running the pump for predetermined periods in response to depression of each of the cup volume select buttons; the water cooler spigot connecting fitting including a cooler spigot insertion cavity, a spigot attachment set screw in connection with the cooler spigot insertion cavity for maintaining the end of a cooler spigot securely within the cooler spigot insertion cavity, and a connecting fitting spigot valve having a fitting spigot handle attached thereto; the connecting fitting spigot valve being positioned such that a continuous water flow pathway exists between the cooler spigot insertion cavity and the intake tube; the frustro-conical shaped coffee maker connecting fitting having a bottom surface provided with a water discharge port in the center thereof and in connection with the discharge tube.

It is a still further object of the invention to provide a water cooler accessory that accomplishes all or some of the above objects in combination.

Accordingly, a water cooler accessory is provided. The water cooler accessory includes a pump unit having an intake tube and a discharge tube, a water cooler spigot connecting fitting attached to the end of intake tube, and a frustro-conical shaped coffee maker connecting fitting attached to the end of the discharge tube; the pump unit including an electric water pump connected between a pump inlet pipe attached to the intake tube and a pump outlet pipe attached to the discharge tube and a pump control unit including a number of cup volume select buttons and a timer circuit in controlling connection with the electric water pump for running the pump for predetermined periods in response to depression of each of the cup volume select buttons; the water cooler spigot connecting fitting including a cooler spigot insertion cavity, a spigot attachment set screw in connection with the cooler spigot insertion cavity for maintaining the end of a cooler spigot securely within the cooler spigot insertion cavity, and a connecting fitting spigot valve having a fitting spigot handle attached thereto; the connecting fitting spigot valve being positioned such that a continuous water flow pathway exists between the cooler spigot insertion cavity and the intake tube; the frustro-conical shaped coffee maker connecting fitting having a bottom surface provided with a water discharge port in the center thereof and in connection with the discharge tube.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
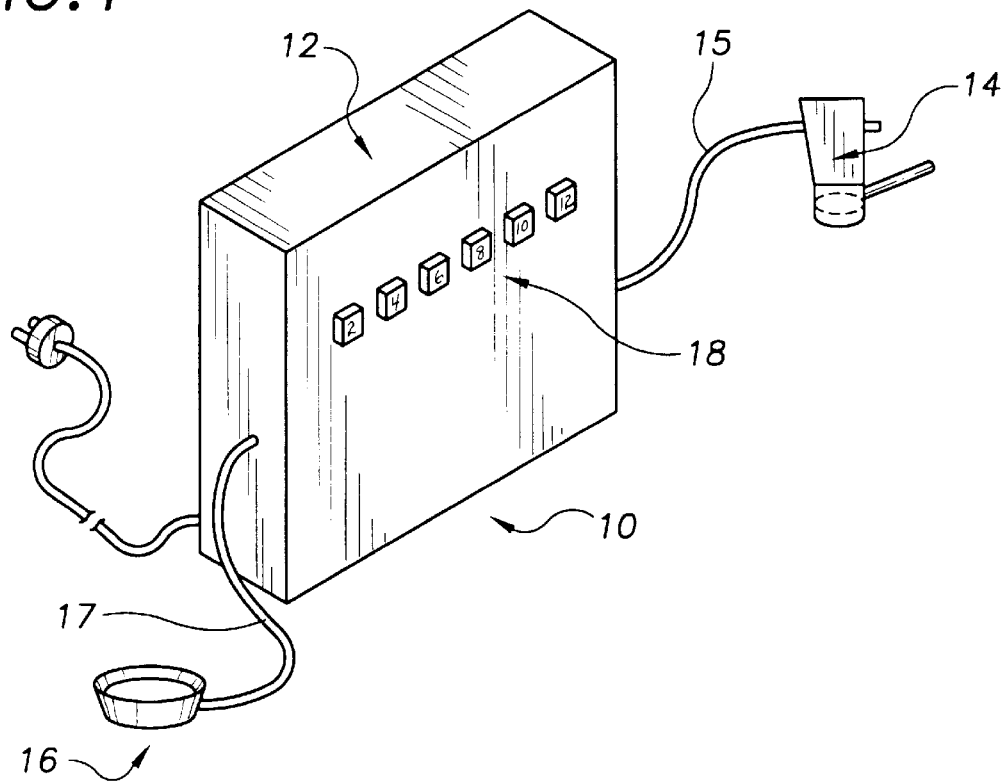
FIG. 1 is a perspective view of an exemplary embodiment of the water cooler accessory of the present invention showing the pump unit including an intake tube and a discharge tube; the water cooler spigot connecting fitting attached to the end of intake tube; and the frustro-conical shaped coffee maker connecting fitting attached to the end of the discharge tube.
Figure 2:
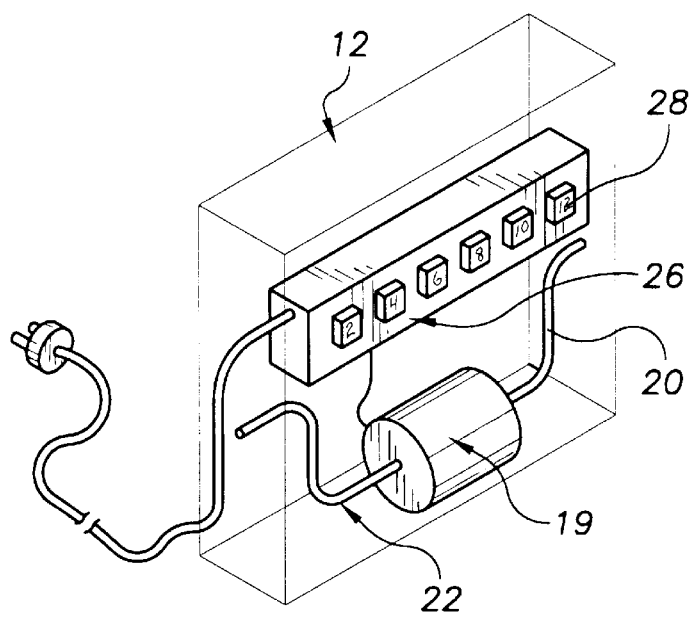
FIG. 2 is a partial cutaway view of- the pump unit showing the electric pump connected between a pump inlet pipe and a pump outlet pipe and the pump control unit including the six cup volume select buttons and a timer circuit for running the pump for predetermined periods in response to depression of one of the cup volume select buttons.
Figure 3:
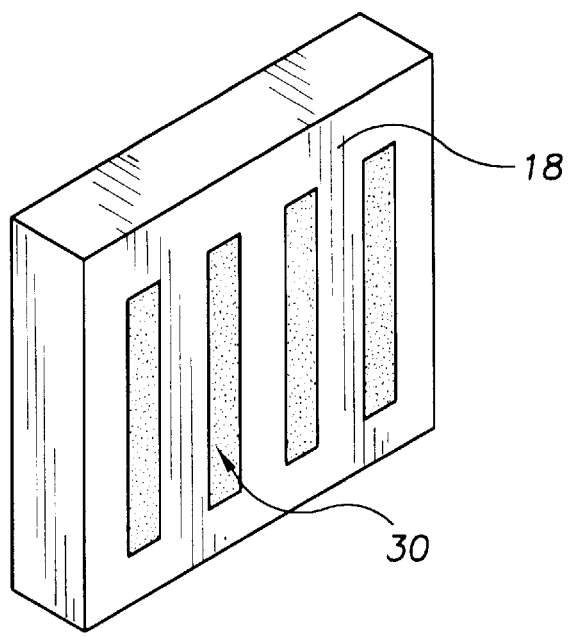
FIG. 3 is a perspective view showing the back of the pump unit housing showing a number of adhesive strips for securing the pump unit housing to a convenient location during installation.

FIG. 1 shows an exemplary embodiment of the water cooler accessory of the present invention generally designated 10. Water cooler accessory 10 includes a pump unit, generally designated 12; a water cooler spigot connecting fitting, generally designated 14, attached to the end of a flexible intake tube 15; and a frustro-conical shaped coffee maker connecting fitting, generally designated 16, connected to the end of a flexible discharge tube 17. Pump unit 12 includes a pump unit housing 18, referring now to FIG. 2, an electric water pump 19, connected between a pump inlet pipe 20 attached to intake tube 15 (FIG. 1) and a pump outlet pipe 22 attached to discharge tube 17; and a pump control unit, generally designated 26 including a number of cup volume select buttons 28 and a timer circuit in controlling connection with electric water pump 19 for running the electric water pump 19 for predetermined periods of time in response to depression of each of the cup volume select buttons 28. Referring to FIG. 3, pump unit housing 18 has a number of adhesive strips 30 provided on the back surface thereof for securing base unit housing 18 to a flat surface during installation.

Figure 4:
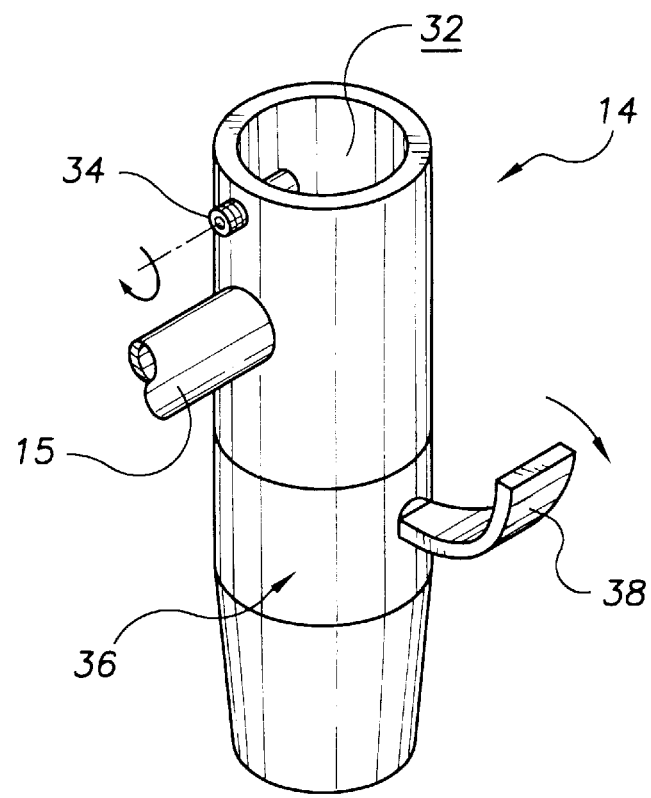
FIG. 4 is a perspective view of the water cooler spigot connecting fitting attached to the end of intake tube showing the cooler spigot insertion cavity, the spigot attachment set screw, and the fitting spigot handle attached to the connecting fitting spigot valve.

Referring to FIG. 4, water cooler spigot connecting fitting 14 includes a cooler spigot insertion cavity 32 formed within a resilient upper portion thereof that is in fluid connection with inlet tube 15 and that is sized to sealing receiving the end of a cooler spigot therein, a spigot attachment set screw 34 for maintaining the end of a cooler spigot securely within cooler spigot insertion cavity 32, and a connecting fitting spigot valve, generally designated 36, having a fitting spigot handle 38 attached thereto. Connecting fitting spigot valve 36 is provided to replace the water cooler spigot valve that must be left open at all times after cooler spigot connecting fitting 14 is secured in place to allow water to be withdrawn from the water cooler in the conventional fashion for drinking and the like.

Figure 5:
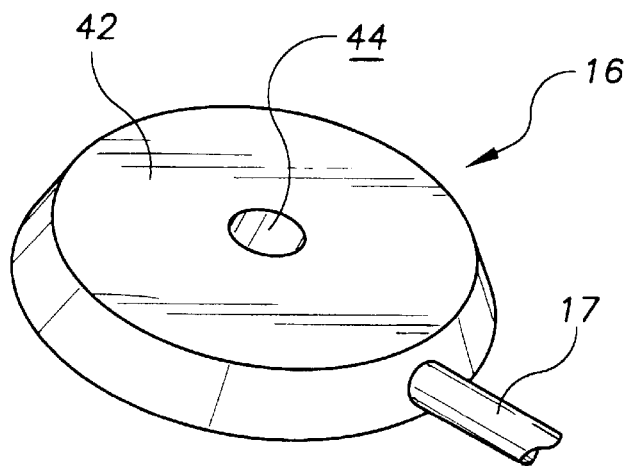
FIG. 5 is a perspective view of the frustro-conical shaped coffee maker connecting fitting attached to the end of the discharge tube showing the water discharge port formed in the bottom center of the bottom surface thereof.
Figure 6:
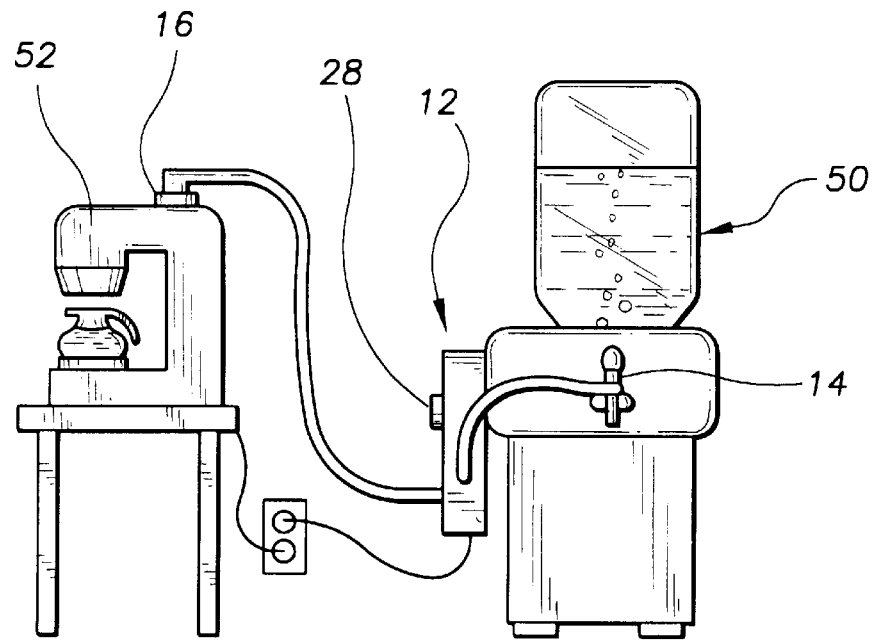
FIG. 6 is a perspective view of the exemplary water cooler accessory of FIG. 1 installed between the cooler spigot of a representative water cooler unit and the water input port of a representative coffee maker.

Referring to FIG. 5, frustro-conical shaped coffee maker connecting fitting 16 is shaped to be insertable into or over the water input opening of a coffee maker. The bottom surface 42 thereof is provided with a water discharge port 44 in the center thereof that is in connection with discharge tube 17.

In use, pump unit 12 is attached to a sidewall of a water cooler 50; the water cooler spigot connecting fitting 14 connected to the water cooler spigot as previously described; and the coffee maker connecting fitting 16 positioned over the water input opening of the coffee maker 52. Each time it is desired to make coffee, the user merely touched the desired cup volume select button 28 to transfer the required amount of water from water cooler 50 to coffee maker 52.

It can be seen from the preceding description that a water cooler accessory has been provided that includes a pump unit having an intake tube and a discharge tube, a water cooler spigot connecting fitting attached to the end of intake tube, and a frustro-conical shaped coffee maker connecting fitting attached to the end of the discharge tube; the pump unit including an electric water pump connected between a pump inlet pipe attached to the intake tube and a pump outlet pipe attached to the discharge tube and a pump control unit including a number of cup volume select buttons and a timer circuit in controlling connection with the electric water pump for running the pump for predetermined periods in response to depression of each of the cup volume select buttons; the water cooler spigot connecting fitting including a cooler spigot insertion cavity, a spigot attachment set screw in connection with the cooler spigot insertion cavity for maintaining the end of a cooler spigot securely within the cooler spigot insertion cavity, and a connecting fitting spigot valve having a fitting spigot handle attached thereto; the connecting fitting spigot valve being positioned such that a continuous water flow pathway exists between the cooler spigot insertion cavity and the intake tube; the frustro-conical shaped coffee maker connecting fitting having a bottom surface provided with a water discharge port in the center thereof and in connection with the discharge tube.

It is noted that the embodiment of the water cooler accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A water cooler accessory comprising:

a pump unit having an intake tube and a discharge tube;

a water cooler spigot connecting fitting attached to an end of intake tube; and a frustro-conical shaped coffee maker connecting fitting attached to an end of said discharge tube;

said pump unit including an electric water pump connected between a pump inlet pipe attached to said intake tube and a pump outlet pipe attached to said discharge tube and a pump control unit including a number of cup volume select buttons and a timer circuit in controlling connection with said electric water pump for running said electric water pump for predetermined periods in response to depression of each of said cup volume select buttons;

said water cooler spigot connecting fitting including a cooler spigot insertion cavity, a spigot attachment set screw in connection with said cooler spigot insertion cavity for maintaining an end of a cooler spigot securely within said cooler spigot insertion cavity, and a connecting fitting spigot valve having a fitting spigot handle attached thereto;

said connecting fitting spigot valve being positioned such that a continuous water flow pathway exists between said cooler spigot insertion cavity and said intake tube;

said frustro-conical shaped coffee maker connecting fitting having a bottom surface provided with a water discharge port in said center thereof and in connection with said discharge tube.

2. The water cooler accessory of claim 1 wherein:

said pump unit having a housing provided with a number of adhesive strips on a surface thereof.

* * * * *